United States Patent Office 3,467,515
Patented Sept. 16, 1969

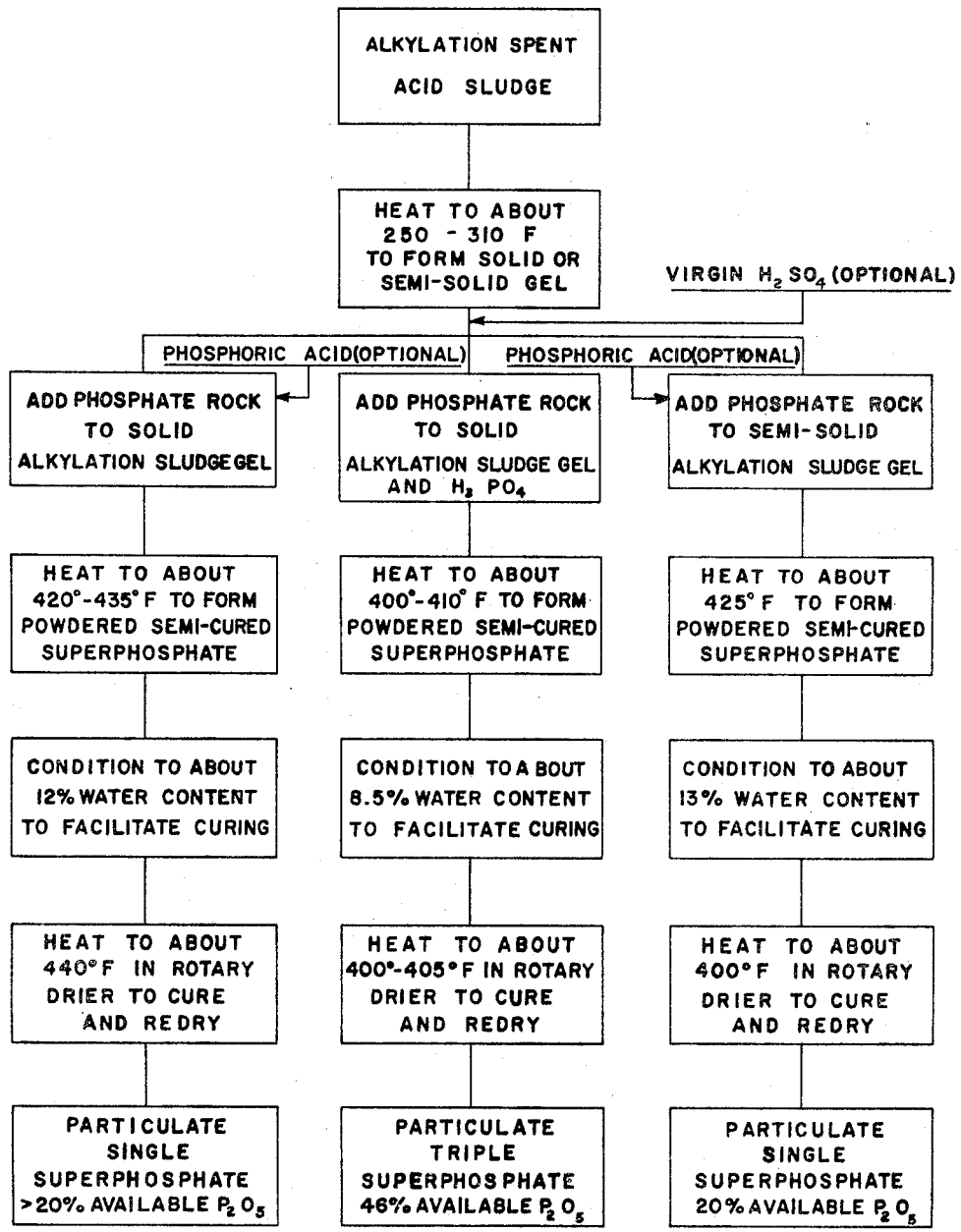
Harold W. Wilson
INVENTOR.

3,467,515
PROCESS FOR THE PREPARATION OF "SINGLE" AND TRIPLE SUPERPHOSPHATE FERTILIZERS USING ALKYLATION SPENT ACID SLUDGES
Harold W. Wilson, c/o Wilson Laboratories, Inc., Box 9851, El Paso, Tex. 79989
Filed Aug. 30, 1966, Ser. No. 576,148
Int. Cl. C05b 1/04, 11/08
U.S. Cl. 71—37            5 Claims

ABSTRACT OF THE DISCLOSURE

A process is disclosed for the production of superphosphate fertilizer from phosphate rock by the heating of alkylation spent acid sludge until the sludge jells after which particulate phosphate rock is added thereto and the acidulated rock heated to form a dry powdered semi-cured superphosphate which is conditioned with water to enhance curing of the superphosphate followed by heating thereof to produce a particulate fluent cured superphosphate fertilizer having a predetermined moisture content.

---

The present invention relates to the production of phosphate fertilizers and more particularly to the production of "single" and triple superphosphates by the acidulation of phosphate rock with alkylation spent acid sludge resulting, for example, from the alkylation process for the manufacture of high test gasoline.

A conventional process for the manufacture of single superphosphate consists of the mixing together of approximately equal parts, by weight, of comminuted phosphate rock and sulfuric acid where the phosphate rock is a combination of tricalicum phosphate and calcium fluoride having a theoretical formula comprising $3Ca_3(PO_4)_2 \cdot CaF_2$. Such phosphate rock usually contains about 35%–36% equivalent $P_2O_5$ and the sulfuric acid utilized to acidulate the phosphate rock is generally a 50° to 55° Baumé aqueous acid solution containing 62%–70% $H_2SO_4$ and 30%–38% water. After the phosphate rock and sulfuric acid solution are intimately mixed the moisture laden reaction product comprising insoluble gypsum and calcium phosphate is generally placed in a pile or bin and allowed to stand for a period of time from 4 to 6 weeks for example, in order to permit "curing" i.e. the time generally required to allow the chemical reaction to go to a reasonable degree of completion so as to insure the availability of approximately 20% phosphoric acid (expressed as $P_2O_5$) in the final product. The cured material, which normally assumes the configuration of an agglomerated self-sustaining mass, is then broken up somewhat and sometimes also conditioned by the addition of minor amounts of water to adjust the moisture content as well as facilitate granulation of the superphosphate by the combined agencies of heating and rolling action of a rotary kiln.

Instead of using a relatively pure aqueous sulfuric acid solution e.g. industrial grade sulfuric acid, alkylation spent acid sludges have been known to be used as sulfuric acid sources for the acidulation of phosphate rock for the manufacture of "single" superphosphate fertilizers having an available phosphoric acid content of approximately 20% (expressed as $P_2O_5$). However, such processes have been characterized by the inherent shortcoming in that the acidulated phosphate rock still had to be cured for a relatively long period of time to carry forth the reaction to a degree of completion consistent with the percentage of available $P_2O_5$ normally present in a single superphosphate.

In conventional processes for the preparation of triple superphosphate it is customary to acidulate phosphate rock with phosphoric acid, rather than sulfuric acid as in the case of single superphosphate, thus avoiding the formation of insoluble gypsum as in single superphosphate thereby resulting in a reaction product characterized by approximately two and one-half to three times the amount of available phosphoric acid (expressed as $P_2O_5$) present in single superphosphate. As with the conventional procedures discussed heretofore, with respect to the production of single superphosphate, the rock acidulated with phosphoric acid undergoes curing and is subsequently granulated in a manner similar to that described above with respect to the production of single superphosphate.

Heretofore, the major problem involved with the use of spent alkylation acid sludges centered about the undesirable conditions brought about when the sludge acid was diluted with water to bring the acid concentration to within the required range of approximately 60–70% for use in acidulating phosphate rock, as was indicated heretofore, for the production of single superphosphate which required a significant curing time to produce a satisfactory fertilizer product. Inasmuch as the alkylation sludges are primarily sulfuric acid it will be appreciated that when such sludges are combined with water significant amounts of heat dilution result and extensive foaming due to liberation of sulfur dioxide, etc. occurs which is followed by the formation of viscous tarry substances, both soluble and insoluble in the system, which separate out only on cooling. Tars so produced include or capsulate some of the acid, as well as being sufficiently sticky and gummy so as to foul all processing equipment with which they come into contact. Accordingly, it will therefore be seen that it is highly undersirable to attempt to render spent alkylation acid sludges suitable for utilization in the manufacture of superphosphate fertilizers merely by diluting the spent acid sludges with water.

Inasmuch as it is a well recognized fact that the primary value of phosphate fertilizers is dependent upon their content of so-called available $P_2O_5$ (the form of phosphorous believed to be most useful by growing plants) any process for the preparation to be of significant value must be such so as to result in obtaining reaction products containing $P_2O_5$ in an available form. Accordingly it will be appreciated that a definite need exists for a process whereby the curing period of four to six weeks required heretofore is obviated thus resulting in economies by virtue of a significant reduction in the process through-time as well as a substantial reduction in the storage and handling equipment necessary.

It will also be noted that conventionally produced triple superphosphate contains from traces to at the most not more than approximately 0.5% sulfur which is contained in the rock phosphate processed, while in the present process, since sulfuric acid as such is one of the ingredients, every end product obtained contains appreciable amounts of sulfur in the soluble and available-for-plant use sulfate ($SO_4^{--}$) form. The amounts of sulfur that can be introduced in the varying products, depending upon the amounts alkylation acid sludges used will range from approximately 4% to 20%. Sulfur, one of the secondary plant nutrients is thus provided in available form ($SO_4^{--}$) with use of products of this invention whereas no claim of a content of any appreciable amount of such sulfur can be made for the conventionally manufactured triple superphosphates.

In conventional superphosphate fertilizers, which contain at most only trace amounts of uncombined sulfuric acid, there content of sulfate sulfur is present largely in the form of highly insoluble gypsum. Products produced by the present process can not only be made to contain more than appreciable amounts of sulfuric acid in uncombined form, but they also contain both organic acids and salts of organic acids such as acetic acid and calcium acetate as examples respectively. Due to the presence in the products of these inorganic and organic acids and acidic salts, along with a gypsum content, when the products are wetted the acids and acidic salts during hydrolytic action solvate the gypsum with the resultant solutions becoming highly acidic. For example, a 1% solution of product in water shows a pH of 2.3–2.5, while a 10% solution exhibits a pH of 1.4–1.5. The quality and the quantity of acidity present permit relatively rapid and complete solubilization of the ordinarily highly insoluble gypsum present. In contrast, solutions obtained from treating superphosphate products made by conventional processes with water are much less acidic where a 1% solution exhibits a pH between 5.3–6.5, and a 10% solution shows pH values between 5.1–5.6. The lack of any content of organic acids as solvating agents in these products results in a very slow and incomplete solubilization of their contents of gypsum. As found true in the cases of superphosphates produced by conventional methods, aqueous solutions of conventionally produced triple superphosphates, likewise, are less acidic with a 1% solution having a pH of 3.5–4.3 and 10% solution exhibiting a pH of 3.0–3.2. Products made by the present process and having similar or higher available $P_2O_5$ than conventional triple superphosphates when dissolved in water form more acidic solutions. For example, 1% solutions show a pH of 2.1–2.3 and 10% solutions show a pH of 1.4–1.5.

In comparing solubilities of the conventional phosphate fertilizers, both super and triple superphosphates, with those as prepared by the present process, products prepared by this process were 15% to 20% more soluble in both netural (pH 7.0) aqueous medium and in alkaline (pH 10.8) aqueous medium where the same particle sized materials were exposed to the same volumes of solutions of identical composition at identical temperatures for the same time periods followed by isolation of the insolubles by the same separation procedure and drying such insolubles at the same temperature for the same time period prior to weighing.

In both super and triple superphosphates made either conventionally or by the present process the phosphate is present predominantly in the form of mono-calcium phosphate (about 30% in super and about 75%–77% in triple super) which is only partially soluble in water but soluble in dilute acetic acid solutions. The balance of the phosphate content (other than small amounts of tricalcium phosphate and some polyphosphate salts) is present in the form of di-calcium phosphate (about 10% in super and 6%–8% in triple super) is almost insoluble in water but soluble in dilute acetic acid solutions. In the present process with the heat treatment of the alkylation acid sludges prior to introducing the phosphate rock and/or no phosphoric acid, as well as throughout the entire process, organic aliphatic acids (predominantly 4 carbon chain and less) are created with acetic acid being preponderant. Part of the organic acids react with the calcium of the sulfuric acid-rock phosphate acidulation reaction to form calcium organic acid salts. When used in fertilization and the product becomes wetted with water, hydrolysis takes place to reform the organic acids which in turn become solvation agents for both the mono- and di-calcium phosphates as well as for any gypsum present. Such action promotes both quicker and more complete solubilization of the entire product. Phosphate fertilizer products prepared by the processes of this disclosure have critical chemical differences giving them a set of separate and distinct values in contrast to those as found in conventionally made products.

These products can be made to contain between 4% and 20% of the secondary plant nutrient, sulfur in the soluble and available sulfate ($SO_4^{--}$) form. In addition products produced by the process of the present invention can be made to contain between about 1% and 5% organic matter derived solely from the alkylation acid sludges used. The organic matter in the finished product is essentially a combination of highly absorbent carbon and polymerized aliphatic straight chain and cyclic hydrocarbon resins, linear alkyl sulfates, sulfites, and phosphate compounds, organic acids, esters, and salts, and minor amounts of various additional oxygen, sulfur, and phosphorous-containing organic compounds. This combination of organic matter dissemminated throughout the end product fertilizer serves to enhance its wetability, solubility, and biodegradability.

These products contain up to 17% more available $P_2O_5$ content than found in any phosphate products produced from use of rock phosphate by known methods which products contain at most 46% available $P_2O_5$. At the same time these products can be made to contain as much as 14%–16% $SO_4^{--}$ (sulfate form of sulfur), while conventionally produced similar products contain at most not more than ¾% to 1% $SO_4^{--}$. These products also contain uncombined sulfuric acid in amounts ranging from 0.5% to 5% along with some content of organic acids and organic acid salts, which combination of acidic materials (absent in conventionally made products) is capable of both increasing the over-all solubility of the product itself as well as materially assisting in keeping its content of $P_2O_5$ in the available state when such product is introduced into alkaline soil mediums.

It is therefore a primary object of the present invention to provide a process for the preparation of single and triple superphosphate fertilizers from phosphate rock wherein the conversion of the $P_2O_5$ of the phosphate rock into the available form thereof is achieved without necessitating a relatively long curing period which heretofore extended over a period of time from a number of days to several weeks.

Another object of the present invention is to provide a process for the preparation of single and triple superphosphate by the acidulation of phosphate rock with spent alkylation acid sludges.

A further object of the present invention is to provide a process for the utilization of spent alkylation acid sludges for the production of single and triple superphosphate fertilizers wherein the fertilizers are characterized by an unreacted amount of sulfuric acid bound by biodegradable organic bodies and silicic acid hemihydrate, for example.

Still another object of the present invention is to provide a process for the production of single and triple superphosphate by the acidulation of phosphate rock with spent alkylation acid sludges which have been treated in such a manner so as to minimize the foaming and frothing which might otherwise be encountered during their use in acidulation of the phosphate rocks.

Still a further object of the present invention is to provide a simple efficient process of using spent alkylation acid sludges, with or without the addition of aqueous phosphoric acid solutions, to produce phosphate fertilizers containing between approximately 22% and 54% total available $P_2O_5$.

Still a further object of the present invention is to provide a process of producing single and triple superphosphate fertilizers resulting from the addition of comminuted phosphate rock to jelled spent alkylation acid sludge, with or without the addition of aqueous phosphoric acid solution thereto, and heating the reactants so as to derive a reaction product comprising a dry, fluent, relatively uncured phosphate. The phosphate is then conditioned with a suitable amount of water followed by additional processing such as by a re-drying procedure in a heated rotary apparatus whereby the available $P_2O_5$ content is significantly increased so as to provide a dry particulate relatively free flowing superphosphate fertilizer characterized by an available $P_2O_5$ content significantly higher than produced by processes known heretofore utilizing spent alkylation acid sludge.

Still a further object of the present invention is to provide single and triple superphosphate fertilizers which contain significant amounts of available sulfur and which because of their reactable acid content maintain higher of about 12 minutes to convert the liquid sludge to a solid gel. 100 grams of comminuted rock phosphate (35.2% $P_2O_5$ content) were added to and intimately mixed with the hot gel after which the mix was heated to 420°–435° F. to the absence of uncombined water and to a dry, powdery state. The intermediate product had a weight of about 170 grams. Water was mixed with this intermediate product until the intermediate product had a water content of 12.4% after which the material while being tumbled in a heated, rotating cylinder became heated to a temperature of 440° F. and accordingly dried and assumed particle sizes ranging between 6–32 mesh Tyler with a weight of 161 grams. Analysis of the intermediate product obtained after the first drying and prior to being conditioned with water and redried showed a total $P_2O_5$ content of 21.29%, an insoluble $P_2O_5$ content of 3.91% and an available $P_2O_5$ content of 17.38%. Chemical analysis of the final product obtained after water conditioning and redrying of the intermediate product showed a total $P_2O_5$ content of 21.67%, an insoluble $P_2O_5$ content of 1.34%, an available $P_2O_5$ content of 20.33%, an organic matter content of 3.5% and a sulfate sulfur content ($SO_4^{--}$) of 56.1%.

EXAMPLE II 30 grams of spent alkylation acid sludge (90.1% $H_2SO_4$) were heated to a temperature of 310° F. for a time period of 8 minutes to convert the liquid sludge to a solid gel. 100 grams of aqueous phosphoric acid solution (54% $P_2O_5$ content) were mixed with the hot gel followed by adding and intimately mixing 100 grams of comminuted phosphate rock (35.2% $P_2O_5$) with the mixture of jelled sludge and aqueous phosphoric acid solution. The resulting mixture was heated to a temperature of 400° F.–410° F. until dry at which time it had a weight of 179.5 grams. It was next conditioned with water to a water content of 8.5% then tumbled in a heated, rotating cylinder where it became heated to a temperature of 400°–405° F. to become dried and assume particle sizes ranging between 4–20 mesh Tyler. The final product had a weight of 171 grams. Chemical analysis of the intermediate product obtained prior to being conditioned with water and redried shows a total $P_2O_5$ content of 49.3%, an insoluble $P_2O_5$ content of 4.03%, and an available $P_2O_5$ content of 45.34%. Chemical analysis of the final product showed a total $P_2O_5$ content of 51.09%, an insoluble $P_2O_5$ content of 1.79%, an available $P_2O_5$ content of 50.11%, an organic matter content of 0.8% and a sulfate sulfur content ($SO_4^{--}$) of 14.1%.

EXAMPLE III

Following is cited an example illustrating the use of spent alkylation acid sludge which was heated to a glue-like consistency rather than to a solid gel. The acid was 88.1% $H_2SO_4$ content, the heating temperature was 300° F., and the heating time prior to addition of the rock phosphate at 300° F. temperature was 4 minutes. 125 grams of rock phosphate (35.2% $P_2O_5$) were added to 145 grams of spent alkylation acid sludge (88.1% $H_2SO_4$) which had been heated as aforedescribed, when, after being mixed intimately together there was a weight loss from reaction of 25.8 grams. The powdery-like product remaining was heated to a temperature of approximately 425° F. until dry, after which a further weight loss of 30.5 grams occurred. This dry, intermediate product was conditioned with water such that it had a water content of 13.4% $H_2O$ after which it was dried at a temperature of approximately 400° F. to give a final product of single superphosphate weighing 207 grams. Chemical analysis of the product obtained by the above noted process showed a content of total $P_2O_5$ of 21.25%, an insoluble (in ammonium citrate solution) content of 1.24%, an available $P_2O_5$ content of 20.01%, an organic matter content of 3.8% and a sulfate sulfur content ($SO_4^{--}$) of 55.2%.

EXAMPLE IV 250 grams of phosphate rock is intimately mixed with a mixture of 50 grams of hot sludge which has been jelled by heating as in Example I and 131 grams of phosphoric acid solution added to give after subsequent treatment of the mixture by conditioning and redrying, 362 grams of phosphate fertilizer product containing 43.8% total $P_2O_5$. The product also contained 0.7% organic matter and 11.1% sulfate sulfur ($SO_4^{--}$).

EXAMPLE V 250 grams of rock phosphate is intimately mixed with a mixture of 100 grams of hot sludge which has been jelled by heating as in Example I and 340 grams of phosphoric acid solution added to give after subsequent treatment of the mixture by conditioning and redrying, 520 grams of phosphate fertilizer product containing 52.7% total $P_2O_5$. The product also contained 0.9% organic matter and 15.0% sulfate sulfur ($SO_4^{--}$).

EXAMPLE VI 125 grams of rock phosphate is intimately mixed with a mixture of 75 grams of hot sludge which has been jelled by heating as in Example I and 88 grams of phosphoric acid solution added to give after subsequent treatment, by conditioning and redrying 224 grams of phosphate fertilzer product containing 36.4% total $P_2O_5$. The product also contained 1.7% organic matter and 26.1% sulfate sulfur ($SO_4^{--}$).

EXAMPLE VII 265 grams of rock phosphate is intimately mixed with a mixture of 150 grams of hot sludge which has been jelled and 170 grams of phosphoric acid solution added to give after subsequent treatment of the mixture by conditioning and redrying, 472 grams of phosphate fertilizer product containing 34.5% total $P_2O_5$. The product also contained 1.6% organic matter and 25.8% sulfate sulfur ($SO_4^{--}$).

EXAMPLE VIII 110 grams of rock phosphate is intimately mixed with a mixture of 110 grams of hot sludge which has been jelled by heating as in Example I and 20 grams of phosphoric acid solution added to give after subsequent treatment of the mixture by conditioning and redrying 190 grams of phosphate fertilizer product containing 25.2% total $P_2O_5$. The product also contained 2.9% organic matter and 46.5% sulfate sulfur ($SO_4^{--}$).

The foregoing is considered as illustrative only of the principles of the invention and accordingly all suitable modifications and equivalents may be resorted to, falling within the scope of the invention.

I claim:

1. A process for the production of superphosphate fertilizer from phosphate rock which comprises:
   heating an alkylation spent acid sludge to a temperature in the range of about 250° to about 310° F. until the sludge jells;
   adding a predetermined amount of a particulate phosphate rock in an amount approximately equal to the weight of the acid present in the alkylation spent acid sludge to said jelled sludge;
   heating the acidulated phosphate rock to a temperature in the range of about 400–450° F. for a suitable length of time to obtain the general absence of uncombined water to form a dry powdered semi-cured superphosphate;
   conditioning the semi-cured superphosphate by the addition of water to establish a moisture content of about 8% to about 14% to facilitate curing of the superphosphate; and
   heating the conditioned semi-cured superphosphate to a temperature in the range of about 400° to about 450° F. in a rotary drying apparatus to produce a levels of available $P_2O_5$ in alkaline soils for longer periods of time than products proposed heretofore characterized by a substantial analogous initial available $P_2O_5$ content but lacking any significant amount of unreacted sulfuric acid bound by biodegradable organic bodies and silicic acid hemihydrate.

These together with other objects and advantages which will become subsequently apparent reside in the details of the process and products thereof as more fully hereinafter described and claimed, reference being had to the accompanying drawings comprising a flow diagram.

Briefly, the process of the present invention for the production of single and triple superphosphate fertilizers comprises the acidulation of comminuted phosphate rock with an acid system resulting from combining hot semi-jelled or jelled spent alkylation acid sludges at a temperature range in the order of about 250–310° F., with or without the addition of aqueous phosphoric acid solution, after which the acidulated rock phosphate-acid system is completely dried by heating to a temperature in the range of about 400° to 450° F. The dried, powdery, intermediate dry product is then conditioned with a sufficient amount of water to bring the water content to approximately 8% to 14% to facilitate carrying forth the acidulation reaction forward to increase the percentage of available $P_2O_5$ to its maximum value after drying. The addition of conditioning water approximating the lower percentage would generally be utilized in conjunction with reactants comprising semi-jelled or jelled spent alkylation acid sludge, comminuted phosphate rock and a certain amount of aqueous phosphoric acid solution, while the higher water percentages utilized for conditioning would be utilized in conjunction with the reactant mixes comprising semi-jelled or jelled spent acid alkylation sludges and comminuted phosphate rock without the addition of any aqueous phosphoric acid solution.

The intermediate product i.e. that phosphate fertilizer product still containing significant amounts of $P_2O_5$ in unavailable form is redried by heating to temperatures preferably in the range of 400°–450° F. by passing the conditioned intermediate product through a heated rotary cylinder i.e. kiln or the like, during which treatment a major portion of the unavailable $P_2O_5$ becomes converted into an available form and the product becomes fixed in a granular form, and dried to a desired moisture content. The product may also contain a certain amount of unreacted sulfuric acid bound by biodegradable organic components and silicic acid hemihydrate.

The exact chemical composition of the spent alkylation acid sludges utilized in carrying forth the process of the present invention is highly variable and quite complex in nature depending primarily upon the petroleum refining operation from which derived. However, since before utilization in the petroleum refining operation they were concentrated sulfuric acids i.e. 98.5%–100% $H_2SO_4$, after being used in such operation they still contain predominant amounts of sulfuric acid i.e. 85–93% $H_2SO_4$ and 5%–10% water, as well as 5–10% combined organic matter, sulphur dioxide, as well as some sulfurous acid.

As indicated heretofore the utilization of spent alkylation acid sludges for the production of single superphosphate fertilizers has been characterized by inherent difficulties attendant the dilution of the acid. Accordingly, in the pratice of the present invention it is proposed to overcome such problems by treating spent alkylation acid sludges, whether or not phosphoric acid be incorporated afterwards, by first heating the sludges to a temperature in the range of approximately 300° F. and holding the sludges at this temperature until they have substantially lost their fluidity and becomes semi-gels or gels thus it will be seen that the jelled form of the spent alkylation acid sludge is used as a starting component for the production of superphosphate fertilizers by the acidulation of phosphate rock.

More specifically, in the process of the present invention where the finished phosphate fertilizer product is to be a single superphosphate having a $P_2O_5$ content between approximately 18% and 22%, a weight of comminuted phosphate rock, approximately equal to the weight of sulfuric acid present in the spent alkylation acid sludge to be used, in added to and intimately mixed with the hot semi-jelled or jelled form of the sludge. By way of general example, approximately 90 parts of comminuted phosphate rock (35.2% $P_2O_5$) is intimately mixed with 100 parts of alkylation sludge, 90% sulfuric acid, which has been jelled by suitable heat treatment. After subsequent treatment of the mixture, in a manner to be more fully described hereinafter, there is produced approximately 152 parts of single superphosphate fertilizer containing approximately 20.7% total $P_2O_5$. Alternatively, when it is desired to produce a finished fertilizer product containing approximately 18%–22% $P_2O_5$ as well as some unreacted sufuric acid, it is necessary to use a somewhat greater amount of the jelled sludge, i.e. keeping in mind the concentration of the acid of course, relative to the amount of phosphate rock. Toward this end, 100 parts of comminuted phosphate rock (35.2% $P_2O_5$) is intimately mixed with 125 parts of alkylation sludge acid (90% $H_2SO_4$) which has been jelled. After subsequent treatment which comprises heating, moisturizing, and redrying there are produced 170 parts of superphosphate fertilizer containing 20.6% $P_2O_5$ and a titratible total acid content equivalent to 28.6% $H_2SO_4$. As indicated heretofore such a product may be advantageously utilized for the fertilization of highly alkaline soils whereby the unreacted sulfuric acid acts both as a neutralizer and as an acidulating agent to maintain a realtively high level of available (usable) $P_2O_5$ for the plants growing in such soil. Since it is recognized that available $P_2O_5$ generally reverts to the unavailable form under alkaline conditions, by providing free, or biodegradably bound, reactable $H_2SO_4$ in the same medium as that in which the available $P_2O_5$ exists the free sulfuric acid therefore acts towards preventing the reversion of available $P_2O_5$ to an unavailable form thereof thus making a phosphate fertilizer of this type produced in accordance with the practice of the present invention far superior to conventional single superphosphate fertilizers proposed heretofore for use in conjunction with alkaline soils.

More specifically with regard to the production of triple superphosphate fertilizers in accordance with the process of the present invention i.e. superphosphate containing between approximately 22% and 54% $P_2O_5$, it is preferable to jell the spent alkylation acid sludge as described heretofore with respect to the production of single superphosphate fertilizers, after which aqueous phosphoric acid solutions are added preferably thereto, particularly when producing triple superphosphate having a $P_2O_5$ content in a range of approximately 52%–54%, which acid systems are utilized to acidulate comminuted phosphate rock such as that containing approximately 35% $P_2O_5$ for example. It will be understood of course that the amounts of sludge, phosphoric acid solution and phosphate rock are being used relative to their respective $P_2O_5$ and acid contents and of course the $P_2O_5$ content desired in the finished superphosphate fertilizer.

The following examples are included to specifically illustrate the process of the present invention for the production of single and triple superphosphate fertilizers and unless otherwise stated, for the purposes of illustration only, it will be understood that the spent alkylation acid sludge utilized had a sulfuric acid content of 85.4%, the aqueous phosphoric acid used as 75% $H_3PO_4$, while the comminuted phosphate rock utilized contained approximately 76% $Ca_3(PO_4)_2$.

EXAMPLE I 115 grams of spent alkylation acid sludge (87.2% $H_2SO_4$ content) were heated at 300° F. for a time period particulate fluent cured superphosphate fertilizer of a desired moisture content.

2. A process for the production of a single superphosphate fertilizer from phosphate rock which comprises:

heating an alkylation spent acid sludge to a temperature of about 250°–310° F. until the sludge jells;

adding a predetermined amount of particulate phosphate rock in an amount approximately equal to the weight of the acid present in the alkylation spent acid sludge to the jelled sludge;

heating the acidulated phosphate rock to a temperature of about 420°–435° F. for a suitable length of time to obtain the general absence of uncombined water to form a dry powdered semicured superphosphate;

conditioning the semi-cured superphosphate by the addition of water to establish a moisture content of about 12%–13% to facilitate curing of the superphosphate; and heating the conditioned semi-cured superphosphate to a temperature of about 400°–440° F. in a rotary drying apparatus to produce a particulate fluent cured superphosphate fertilizer of a desired moisture content.

3. A process for the production of a triple superphosphate fertilizer from phosphate rock which comprises:

heating an alkylation spent acid sludge to a temperature of about 250°–310° F. until the sludge jells;

adding particulate phosphate rock in an amount approximately equal to the weight of the acid present in the alkylation spent acid sludge to the jelled sludge;

heating the acidulated phosphate rock to a temperature of about 400°–410° F. for a suitable length of time to obtain the general absence of uncombined water to form a dry powdered semi-cured superphosphate;

conditioning the semi-cured superphosphate by the addition of water to establish a moisture content of about 8% to about 14% to facilitate curing of the superphosphate; and heating the conditioned semi-cured superphosphate to a temperature of about 400°–405° F. in a rotary drying apparatus to produce a particulate fluent cured triple superphosphate fertilizer of a desired moisture content.

4. The process of claim 3 wherein phosphoric acid is added to the jelled sludge when acidulating the phosphate rock.

5. The product produced by the process of claim 1.

References Cited

UNITED STATES PATENTS 2,418,203   4/1947   Stauffer _____ 71—40

S. LEON BASHORE, Primary Examiner

R. D. BAJEFSKY, Assistant Examiner

U.S. Cl. X.R.

71—40